Oct. 7, 1941.   M. E. KEMPER   2,257,962

BOLT AND WEDGE ASSEMBLY

Filed June 21, 1940

INVENTOR,
Merle E. Kemper.
BY Hovey & Hamilton,
ATTORNEYS.

Patented Oct. 7, 1941

2,257,962

UNITED STATES PATENT OFFICE 2,257,962

BOLT AND WEDGE ASSEMBLY

Merle E. Kemper, Kansas City, Mo.

Application June 21, 1940, Serial No. 341,689

2 Claims. (Cl. 85—8)

This invention relates to improvements in bolt and wedge assemblies, and particularly, to a bolt and wedge assembly suitable for fitting-up purposes.

In structural steel fabrication, and many other types of structural work, it is common practice to use a fitting-up device for positioning the various members to facilitate the positioning of the bolts or rivets used as permanent fastening means.

It is an object of the present invention to provide a bolt and wedge assembly adapted to function to fit together members having any combined thickness between a predetermined minimum and maximum.

A further object is the provision of a bolt and wedge assembly of simple and inexpensive structure that may be quickly and easily operated to fit together members that are to be permanently secured together by means of other fasteners.

Reference will now be had to the drawing wherein.

Figure 1:
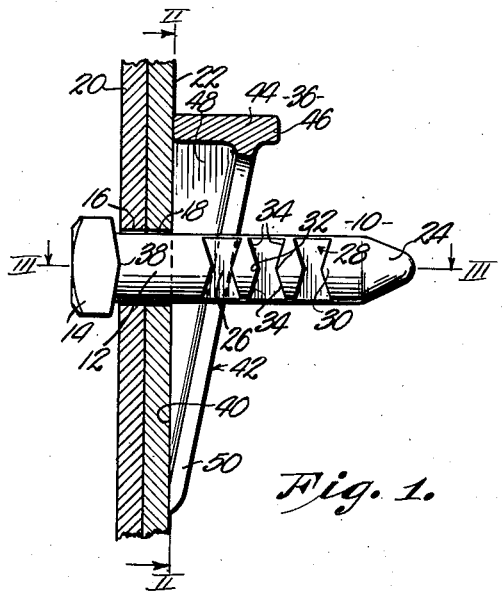
Figure 1 is a partially sectional view of a bolt and wedge in position on work, embodying this invention.

Throughout the several views, like reference characters refer to similar parts and the numeral 10 designates a bolt having a body portion 12 and a head 14.

For convenience of positioning the bolt 10 into openings 16 and 18, formed through structural members 20 and 22 respectively, the outer end thereof is made conical in form as at 24. The outer end of the bolt may be of any other reduced form suitable for engaging and registering holes which are relatively offset in members to be joined together.

The bolt 10 is similarly notched at its opposite sides at 26, in such a manner that the inside walls 28 thereof, are substantially parallel. The notches 26 are formed to present opposed V-shaped ledges 30 disposed transversely of the bolt and having their apices or vertexes 32 disposed in a common line passing through the axis of the bolt.

Referring to Fig. 1, it will be noted that the tapered side walls 34 of the ledges are so angled to the axis of the bolt that the wedge 36 may be easily inserted and that it will rest against the vertex of the ledge during the fitting-up operation. The inner face of head 14 of the bolt is formed to present a bearing edge 38, which is in the plane common to the vertexes of said ledges. The principal object of positioning the bearing points in a common plane, is to set up a central pull on the bolt, regardless of the relative relation of the openings in the members being fitted together.

Wedge 36 has an inside face 40 disposed in a plane adapted to be normally disposed at a right angle to the axis of the bolt and an outside surface 42 disposed in a plane forming an acute angle with the plane of said inside face. The wedge is provided with a head 44 having an outwardly overhanging ledge 46 which facilitates easy removal of the wedge from the bolt.

A recess or cavity 48 formed inwardly from the inside face of the wedge is of a dimension sufficient to permit the entrance of the body of the bolt therein. The wedge 36 is bifurcated inwardly from its thin edge and is provided at its outer surface with spaced apart, opposed ribs 50, which are adapted to be inserted into notches 26 to engage ledges 30, whereby the members positioned on the bolt between the head thereof and the wedge may be drawn together.

It will be noted that the thickness of ribs 50 is slightly less than the smaller width of the notches so that the rib will pass through said notches at any desired angle.

It is one of the important features of this invention to provide a notched bolt and an adjustable wedge of such proportions that the distance between the bolt and wedge may be adjusted to any desired position, between a predetermined minimum and maximum. This is obtained by making the effective lift of the wedge greater than the distance between like points of adjacent notches in the bolt. This relative relation of the various dimensions is made possible by the recessing of the wedge so that the bolt may enter therein as the ribs 50 are positioned in the respective notches to draw the structural parts together. The length and angle of the wedge may be varied to obtain greater or lesser pulling action of the wedge, also the distance between the notches in the bolt may be varied to meet special conditions.

Figure 2:
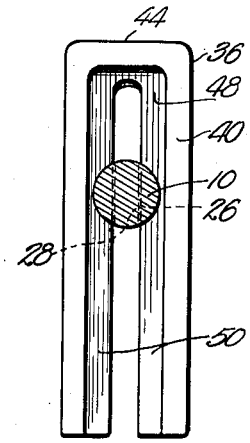
Fig. 2 is a sectional view taken on line II—II of Fig. 1.
Figure 3:
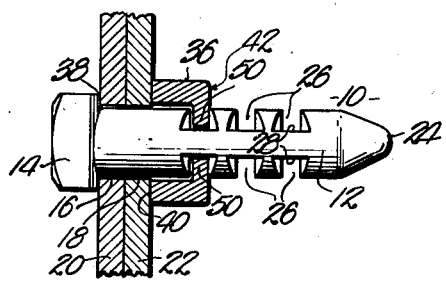
Fig. 3 is a central cross sectional view taken on line III—III of Fig. 1, the bolt itself being shown in elevation.
Figure 4:
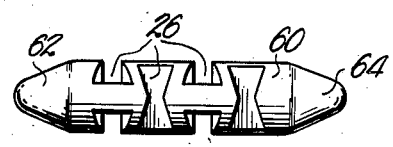
Fig. 4 is an elevational view of a modified form of the bolt.

The modified form shown in Fig. 4, comprises a headless bolt 60 having its opposite ends 62 and 64 tapered and provided at its body portion with notches and ledges similar to those shown in Figs. 1, 2 and 3, but with adjacent notches of the two series disposed at right angles to each other. This type of bolt is especially suited to be used where two channels, positioned back to back and at an angle to each other, are to be joined together. Two wedges are intended to be used with this bolt, one at each side of the work. When using this bolt, the angle of the wedges may be reduced and the one most accessible to the workman, may be driven into the notches to make the final draw.

Figure 5:
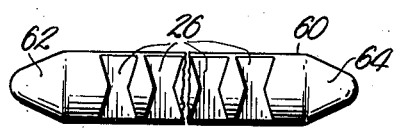
Fig. 5 is a further modified form of the bolt.

The form of bolt shown in Fig. 5 is similar to that shown in Fig. 4, with the exception that all the notches are positioned in like manner. Furthermore, the bolt may be of any desired length with notches at each end portion for special use in concrete construction forms where the bolts are to be withdrawn from the concrete structure when the forms are to be removed.

In the use of this assembly for fitting together members, the bolt is first positioned in the corresponding holes of two or more structural members, then the wedge is placed in the notches and driven therein to draw the members together. If this first draw does not properly position the parts, then the wedge may be withdrawn and inserted in the notch exposed nearest the outside structural member and again driven into position to draw the members together. This operation may be repeated a sufficient number of times to fit the structural members together. During the changing of the wedge from one notch to another, it may be necessary to hold the structural members against relative movement by some outside means.

Having thus described the invention, what is claimed as new and desired to be secured by Letters Patent is:

1. A bolt and wedge assembly comprising a bolt having a head having a V-shaped inner face with the apex thereof on a line intersecting the axis of said bolt; and having notches formed in the opposite sides of the body of the bolt to form two similar series of V-shaped ledges with apices thereof disposed parallel with the apex of the under face of said head; and a bifurcated wedge recessed on its inner side to receive said bolt and spaced apart parallel ribs of substantially uniform thickness adapted to respectively operate against the apices of corresponding ledges at opposite sides of said bolt whereby any distance between a predetermined maximum and minimum may be obtained between the head of the bolt and the inner face of said wedge.

2. A bolt and wedge assembly comprising a bolt having a head having a V-shaped inner face with the apex thereof on a line passing through the axis of said bolt and having notches formed in the opposite sides of the body of the bolt to form two similar series of V-shaped ledges, having their apices in a common plane determined by the axis of said bolt and the apex of said inner bolt head face; and a bifurcated wedge recessed on its inner side to receive said bolt and having spaced apart parallel ribs of substantially uniform thickness adapted to respectively operate against the apices only of corresponding ledges at opposite sides of said bolt whereby any distance between a predetermined maximum and minimum may be obtained between the head of the bolt and the inner face of said wedge.

MERLE E. KEMPER.